T. A. C. BOTH.
ATTACHMENT PLUG.
APPLICATION FILED SEPT. 2, 1910.
985,775.
Patented Mar. 7, 1911.
2 SHEETS—SHEET 1.
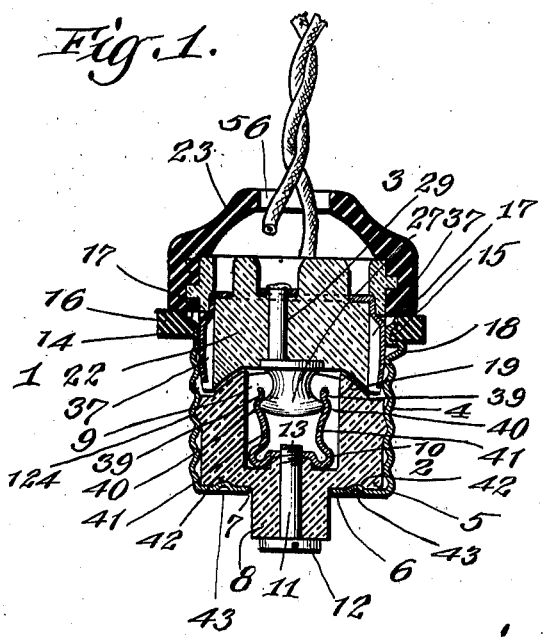
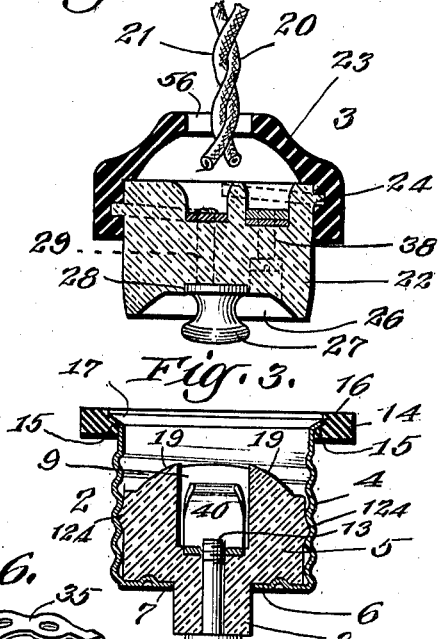
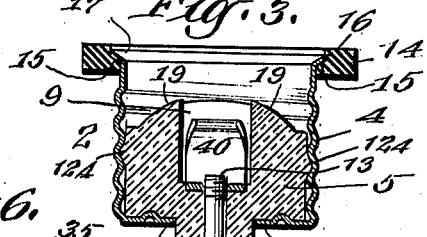
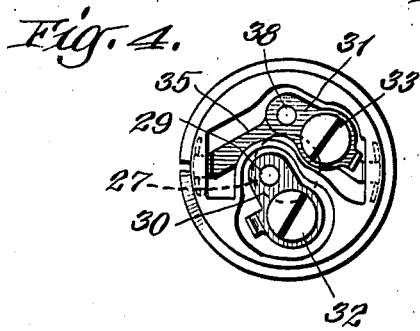
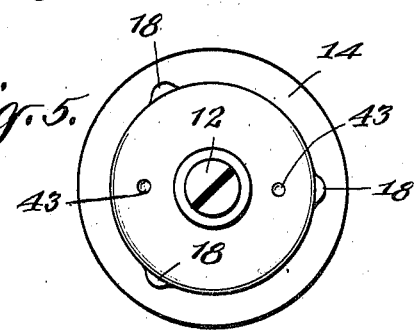
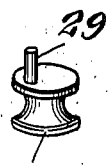
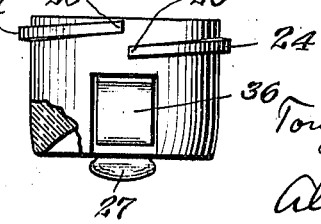
WITNESSES
Heischein
R. Menke
INVENTOR
Tonjes A. C. Both
BY
Alan M. Johnson
ATTORNEY

T. A. C. BOTH.
ATTACHMENT PLUG.
APPLICATION FILED SEPT. 2, 1910.

985,775.

Patented Mar. 7, 1911.

2 SHEETS—SHEET 2.

WITNESSES
H. Levocheron
R. Munk

INVENTOR
Tonjes A. C. Both
BY
Alan M. Johnson
ATTORNEY

UNITED STATES PATENT OFFICE.

TONJES AUGUST CARL BOTH, OF NEW YORK, N. Y., ASSIGNOR TO IDA S. ROSENHEIM, OF NEW YORK, N. Y.

ATTACHMENT-PLUG.

985,775.  Specification of Letters Patent.  Patented Mar. 7, 1911.

Application filed September 2, 1910. Serial No. 580,242.

*To all whom it may concern:*

Be it known that I, TONJES AUGUST CARL BOTH, a citizen of the United States, and a resident of New York, in the county of New York and State of New York, have invented new and useful Improvements in Attachment-Plugs, of which the following is a specification, taken in connection with the accompanying drawings, which form a part of the same.

This invention relates to attachment plugs and is an improvement upon United States Patent No. 845,712, dated February 26, 1907, granted to Ralph A. Schoenberg, as the assignee of C. J. Klein and United States Patent No. 935,523 granted September 28, 1909 to Ida S. Rosenheim, as the assignee of said C. J. Klein.

The present invention covers an improved attachment plug wherein the number of parts in the patents referred to is reduced, which among other advantages permits the plug to be made smaller, and generally simplifies the construction, and reduces the cost of manufacture.

It also covers certain details of construction all of which will be hereinafter more fully described and set forth in the claims.

Figure 9:
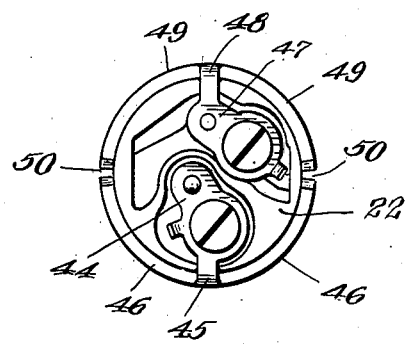
Figure 10:
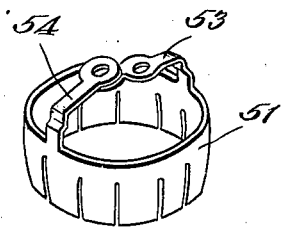
Figure 11:
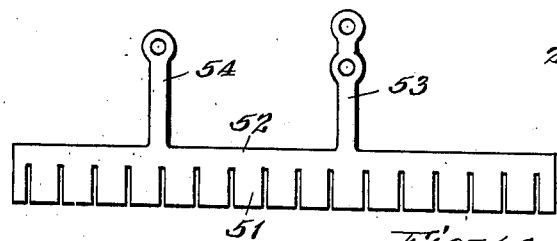
Figure 12:
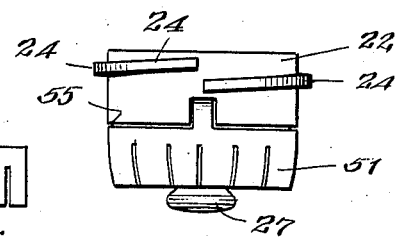
Figure 13:
Figure 16:
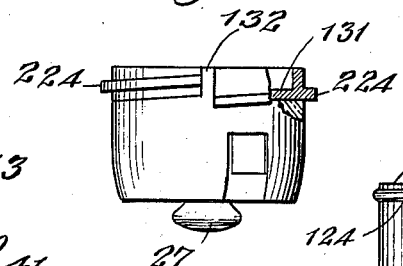
Figure 14:
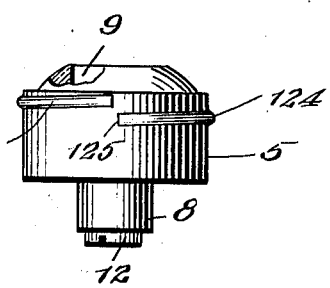
Figure 15:
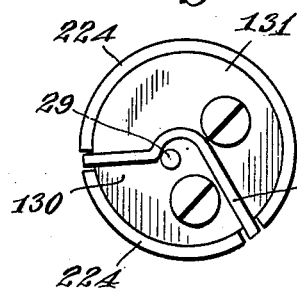

In the accompanying drawings showing illustrative embodiments of my invention and in which the same reference numerals refer to similar parts in the several figures:—Figure 1 is a vertical section through my improved attachment plug. Fig. 2 is a vertical section through the cap removed from the lower portion of the base of the plug; Fig. 3 is a vertical section through the base of the plug; Fig. 4 is a plan view of the cap with the cover removed; Fig. 5 is a bottom plan view of the base of the plug; Fig. 6 is a perspective view of one form of spring contact; Fig. 7 is a side elevation of the cap with the cover omitted; Fig. 8 is a detail perspective view of the eccentric stud;
Fig. 9 is a plan view of the cap with the cover omitted, showing a modified arrangement of screw threads; Fig. 10 is a modified form of spring contact; Fig. 11 is a plan view of the blank from which the contact shown in Fig. 10 is preferably made; Fig. 12 is a side elevation of the modification showing the manner of mounting the spring contact shown in Fig. 10. Fig. 13 is a detail perspective view; Fig. 14 is a detail side elevation partly broken away; Fig. 15 is a plan view showing the preferred manner of mounting the screw threads; and Fig. 16 is a side elevation of the structure shown in Fig. 15, partly broken away.

In the illustrative embodiments of the invention shown 1 is an attachment plug formed of a base 2 and cap 3. The base consists of the screw shell contact 4 and an insulating body member 5 which fits within the bottom portion of the screw shell contact 4. The bottom 6 of the screw shell contact is provided with a central aperture 7 through which extends a reduced apertured foot 8 of the body member 5.

I hollow out the central portion of the body member 5 forming a single central cavity 9 for the reception of the spring tension conducting member 10 which is secured to the center contact 11. This center contact is preferably in the form of a screw, its head 12 being the center contact of the attachment plug 1, while its screw threaded stem 13 coöperates with and secures the spring tension conducting member 10, Fig. 1.

On the upper portion of the screw shell contact 4 I secure a guard ring or non-conducting member 14 preferably by providing its inner circumference with a shelf or shoulder 15 at some distance beneath its upper surface 16 so as to permit the end 17 of the screw shell contact 4, after the ring 14 has been properly positioned on the screw shell contact, to be swaged or otherwise bent until it lies upon and coöperates with the shelf or shoulder 15. To prevent this guard ring from moving down upon the screw shell 4, or otherwise becoming displaced the screw shell is preferably provided with two or more outwardly extending lugs 18, 18 Figs. 1 and 5, by pressing the metal of the screw shell outwardly or by otherwise forming the lugs or projections. This non-conducting ring or guard will then be held securely between these lugs 18, 18 and the upper swaged edge of the screw shell 4, Fig. 1. These parts are so positioned that the end 17 of the screw shell 4, will be thoroughly protected by the non-conducting guard or ring 14, which is preferably, though not necessarily made of fiber, or any other suitable insulating material. By this arrangement accidental contact with the screw shell contact 4 is prevented.

The upper portion of the insulating body member 5 is made into a crown or convex surface 19. To more securely hold the body member 5 and the screw shell 4 together and prevent their relative rotation, I preferably provide the lower surface of the body member with a series of indentations 42. After the members 4 and 5 are assembled I preferably form inwardly extending lugs 43, on the screw shell contact 4 by pressing the metal into one or more of the indentations 42. This can be done with any suitable tool.

The cap 3 for purposes of radially attaching the feed wires 20 and 21 is formed into two detachable portions; an insulating body member 22, preferably formed of porcelain and a removable cover 23, the two being preferably connected by a screw thread 24 which may be formed integral with the insulating body member 22, Fig. 2. This screw thread 24, to permit the molds to be readily withdrawn after molding the insulating portion or body member 22 has its respective ends 25, 25 staggered with relation to each other, so that the upper mold (not shown) can be readily withdrawn from the lower one, this staggered feature being more clearly shown in Fig. 7. The female screw thread in the cover 23 is also staggered for the same reason. I also preferably make this screw thread 24 square in cross section which I have found particularly advantageous in practice in that it insures the cover 23 snugly fitting the body member 22 without any lost motion or tendency to rattle.

To permit the molds to be readily separated in molding the insulating body member 5 I also provide it with a single integral screw thread 124, Figs. 1, 2, and 14, having its ends 125 and 125 not quite encircling the member and arranged staggered with relation to each other.

The lower surface of the body member 22 is formed into a dome or concave surface 26 to coöperate with the crown or convex surface 19 of the lower insulating member 5, for a reason which will be more fully hereinafter pointed out. Within the center of the insulating body member 22 I mount a short stud 27 to coöperate with the spring tension conducting member 10. To insure the entire attachment plug, and more particularly the cap, to be made as small as possible I mount this center stud 27 in a peculiar manner. As shown in Figs. 1 and 2 it is mounted in a recess or rabbeted portion 28 in the dome or concave surface 26 of the insulating member 22. Eccentrically mounted upon this stud 27 is a stem 29, Figs. 1, 2 and 8, which passes through the member 22 and through the binding plate 30, Fig. 4, its end being upset as shown in Fig. 1. In this manner the binding plate 30 is secured to the stud 27. By reference to the dotted lines in Fig. 4, indicating the stud 27, it will be seen that if the stem 29 was mounted concentric to the axis of the stud 27 it would necessitate a rearrangement of the binding plates 30 and 31, Fig. 4. The distance between the two binding screws 32 and 33 would have to be increased and consequently the entire area of the body member 22 would have to be enlarged which would of necessity enlarge the entire cap of the attachment plug. By mounting the stud 27 in the recess 28, Figs. 1 and 2, of the member 22 I insure that the axis of the stud will always coincide with the axis of the body member 22 even though the eccentric stem 29 is employed. Consequently the stud 27 will always be in the proper position to coöperate with the tension conducting member No. 10.

For purposes of description it will be considered that the feed wire 21 is connected to the binding screw 32 while the other feed wire 20 is connected to the binding screw 33 secured to the binding plate 31. Beneath this binding plate 31 I mount a spring contact member 34, Fig. 6, formed of a bridge piece 35 and two downwardly extending spring arms 36, 36. This bridge piece 35 is formed of sufficient length to permit the spring contact arms 36, 36 to become seated in the recess 37, 37 of the body member 22 and to preferably extend slightly beyond the periphery of said member so as to make direct contact with the shell contact 4. The bridge piece 35 and the binding plate 31 are secured together and to the body member 22 by any suitable means such as by the screw 38, Fig. 2.

The tension conducting member 10, which is connected to the center contact 11 and coöperates with the stud 27, is preferably formed out of a single piece of spring metal to form two jaws 39, 39 each having a bent portion 40, 40, Figs. 1 and 13 which securely hold the stud 27 against accidental disconnection. Each arm or fork of this member 10 is also provided near its lower portion with another crimp or bend 41 which materially prolongs the life of this spring member and increases its resiliency.

In some instances where it may not be desired to cast the screw thread 24 upon the body member 22 I form the screw thread of metal or other suitable material and connect it to the binding plates. By way of example I have shown in Fig. 9 such a construction wherein the binding plate 44 is provided with an arm 45 and this arm has two wings 46, 46 which are bent to conform with the circumference of the body member 22 and partly surround it. The similar binding plate 47 is also provided with an arm 48 and two wings 49, 49 which are also made to conform to the circumference of the body member 22 and partly surround it; sufficient gaps 50, 50 being left between the respective arms 46, 46 and 49, 49 to prevent short circuiting or sparking. The respective binding plates 44 and 47 together with their respective arms 45, 48, and wings 46, 46 and 49, 49 are preferably stamped out of one piece of sheet metal and the wings are so arranged as to form a slight spiral or thread. This may be accomplished for example by forming the arms 48 of a little greater length than the arm 45, and correspondingly shaping the respective wings to form a spiral or thread.

In the preferred construction, Figs. 15 and 16 I form the binding plates 130 and 131 with preferably integral depending flanges provided with a screw thread 224 the flanges being separated from each other. The plates are also separated from each other by preferably a ridge 132 carried by the insulating body member.

In some cases instead of making the spring contact 34 as shown in Fig. 6, I may make this contact in the form of a ring 51, preferably a split one, and preferably form it from a blank 52, Fig. 11, the completed ring being illustrated in Fig. 10. This ring is provided with two integral arms 53 and 54, their ends overlapping each other. When such a ring is used instead of forming recesses 37, 37 in the body member 22 of the body cap I reduce the lower portion of the body member 22, Fig. 12 forming a circumferential groove 55 for the reception of the ring 51, it of course being understood that in both constructions the ring 51 as well as the arms 36, 36 contact directly with the screw shell contact 4 of the attachment plug.

In using my invention the feed wires 20 and 21 are passed through the opening 56 in the cover 23, the cover being given a revolution to disconnect it from the body member 22, so that the ends of the feed wires can be connected to their respective binding posts 32 and 33. Current being supplied for example through the feed wire 21 to the binding post 32 will pass through the binding plate 30, stem 29, stud 27, tension member 10, center contact 11 through the electric light or other consuming device and back through the shell contact 4, spring arms 36, 36, which are in direct contact with the shell contact 4, and then out through the binding plate 31 and feed wire 20.

By forming the body member 22 with a dome or concave surface and the body member 5 with a crown or convex surface I insure that the stud 27 and the spring tension member 10 will always be surrounded, when the parts are connected, as well as while being connected and disconnected, by a wall of insulating material said wall being carried partly by the cap and partly by the base. Furthermore these convex and concave surfaces are so formed as to entirely inclose and conceal any arc which may be formed by the disconnection of the cap from the base and consequently they prevent any damage being done by the arc.

The parts are so proportioned that in whatever manner the electrical connection is broken, whether by a straight pull or by an angular blow or twist the current is first broken between the stud 27 and the spring tension member 10 and while these parts are surrounded by the convex and concave surfaces carried respectively by the base and cap. After this disconnection of the current the spring arms 36, 36 will then be withdrawn from contact with the screw shell 4. There will, however, be no arcing on the disconnection of these latter elements.

In the construction shown in Figs. 9, 15, and 16 the metallic screw threads, which will become charged, are received and entirely surrounded by the insulating cover 23 so that they cannot endanger the operator or short-circuit the current.

In all forms shown of my invention the cap and base are swivelly and separably connected together so that they can be separated by either a pull in a horizontal line or by rocking or pulling them at an angle to each other; the latter operation being known as angular separation of the parts.

Having thus described this invention in connection with several illustrative embodiments thereof to the details of which I do not desire to be limited, what is claimed as new and what it is desired to secure by Letters Patent is set forth in the appended claims.

1. In an attachment plug the combination of a metallic screw shell, a hollow insulating member held within the screw shell, said insulating member being provided with a cavity and with a convex surface, a second insulating member provided with a concave surface to coöperate with the convex surface of the other insulating member and side contacts carried by the second insulating member to contact directly with the screw threads of the first member and coöperating detachable center contacts carried by the hollow insulating member and by the second insulating member.

2. An attachment plug comprising a screw shell contact, an insulating body member mounted within the screw shell contact and provided with a central aperture and with a convex head, a spring contact mounted in the opening in the body member, a center contact connected to said spring contact, a detachable cap provided with a centrally mounted stud to coöperate with the spring contact and with spring contacts adapted to contact directly with the screw shell contact.

3. An attachment plug comprising a screw shell contact, an insulating body member mounted within the screw shell contact and provided with a central aperture and with a convex head, a spring contact mounted in the opening in the body member, a center contact connected to said spring contact, a detachable cap provided with a centrally mounted stud to coöperate with the spring contact mounted in the opening in the lower body member, said stud being provided with an eccentrically mounted stem, and spring contacts adapted to contact directly with the screw shell contact.

4. A cap for an attachment plug comprising an insulating member and cover, a stud, binding plates, and means carried by the binding plates to secure the cover to the body member of the cap.

5. A cap for an attachment plug comprising an insulating member and cover, a stud, binding plates, and screw threads carried by the binding plates to secure the cover to the body member of the cap.

6. In an attachment plug the combination of a base provided with a shell, an insulating body member mounted in the shell, said insulating body member being of less height than the height of the shell thereby leaving a portion of the interior surface of the shell exposed, a center contact mounted in the insulating body member, and a detachable cap provided with a center contact to contact with the center contact of the base and also provided with a bridge piece and two downwardly extending spring arms to directly contact with the exposed surface of the shell.

7. In an attachment plug the combination of a base provided with a shell, a non-conducting guard ring secured to the upper edge of the shell, an insulating body member mounted in the shell, said insulating body member being of less height than the height of the shell thereby leaving a portion of the interior surface of the shell exposed, a center contact mounted in the insulating body member, and a detachable cap provided with a center contact to contact with the center contact of the base and also provided with a bridge piece and two downwardly extending spring arms to directly contact with the exposed surface of the shell.

8. In an attachment plug the combination of a base provided with a shell, an insulating body member mounted in the shell, said insulating body member being of less height than the height of the shell thereby leaving a free portion of the surface of the shell to form one element of an electrical connection, a center contact carried by the insulating body member, having an electrical contacting surface of less length than that of the free portion of the shell, a detachable cap provided with a center contact to coöperate with the center contact of the base and with a bridge piece and two downwardly extending spring arms to contact with the free portion of the shell, thereby insuring that the center contact is disconnected before the shell contact.

TONJES AUGUST CARL BOTH.

Witnesses:
  LEON STRAUSS,
  MARTIN F. BALDWIN.